US011336485B2

(12) United States Patent
Semwal et al.

(10) Patent No.: US 11,336,485 B2
(45) Date of Patent: May 17, 2022

(54) HITLESS LINKUP OF ETHERNET SEGMENT

(71) Applicant: Arista Networks, Inc., Santa Clara, CA (US)

(72) Inventors: Rajesh Kumar Semwal, Sunnyvale, CA (US); Amit Dattatray Ranpise, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 84 days.

(21) Appl. No.: 16/726,183

(22) Filed: Dec. 23, 2019

(65) Prior Publication Data

US 2021/0194729 A1  Jun. 24, 2021

(51) Int. Cl.
  *H04W 56/00* (2009.01)
  *H04L 12/46* (2006.01)
  *H04L 45/50* (2022.01)
  *H04L 45/00* (2022.01)
  *H04L 45/02* (2022.01)
  *H04L 45/64* (2022.01)

(52) U.S. Cl.
  CPC ...... *H04L 12/4633* (2013.01); *H04L 12/4641* (2013.01); *H04L 45/02* (2013.01); *H04L 45/50* (2013.01); *H04L 45/64* (2013.01); *H04L 45/66* (2013.01)

(58) Field of Classification Search
  CPC . H04L 12/4633; H04L 12/4641; H04L 45/02; H04L 45/50; H04L 45/64; H04L 45/66
  USPC .......................................................... 370/329
  See application file for complete search history.

(56) References Cited

U.S. PATENT DOCUMENTS 10,142,129 B1 * 11/2018 Gupta ................. H04L 12/4641
2020/0021523 A1 * 1/2020 Wang ................. H04L 12/4641

OTHER PUBLICATIONS

Nagaraj, Rabadan et al., "EVPN Multi-Homing Extensions for Split Horizon Filtering draft-nr-bess-evpn-mh-split-horizon-02", BESS Workgroup, Nov. 1, 2019, received at https://tools.ietf.org/html/draft-nr-bess-evpn-mh-split-horizon-02 (15 pages).

* cited by examiner

*Primary Examiner* — Sai Ming Chan
(74) *Attorney, Agent, or Firm* — Chamberlain, Hrdlicka, White, Williams & Aughtry

(57) ABSTRACT

Techniques are presented herein for managing the processing of network data units (NDUs) received by a network device. More specifically, the techniques relate to updating NDU processing information in a network device in response to a link becoming active, where the updating reduces the NDU loss when the NDU processing information is being updated.

20 Claims, 7 Drawing Sheets

HITLESS LINKUP OF ETHERNET SEGMENT

BACKGROUND

Various mechanisms are used to route and/or forward traffic within a network. Network resources are required to implement these mechanisms. As the size of the network increases, the network resources required to implement the aforementioned mechanisms may impact the performance of the network.

DETAILED DESCRIPTION

Figure 1:
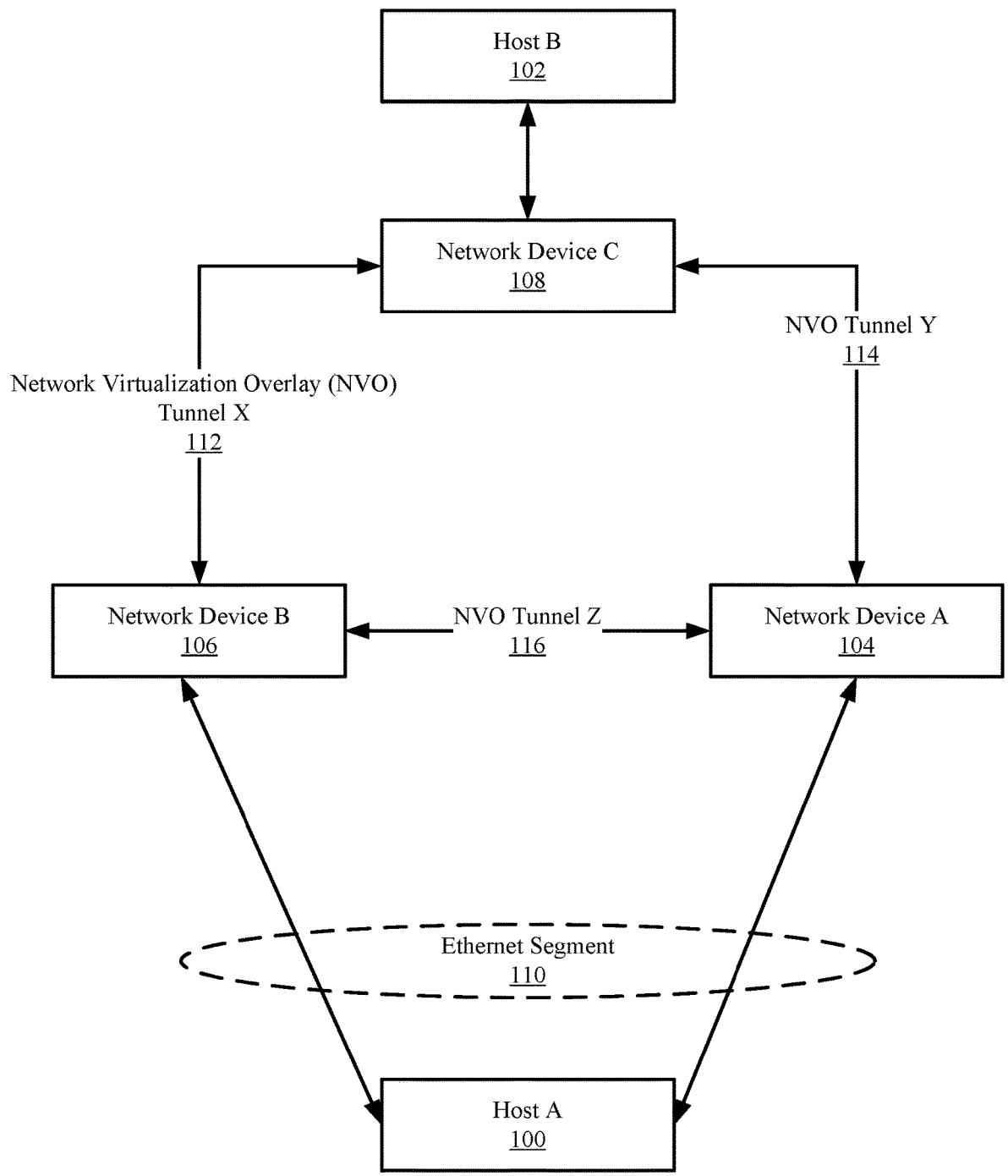
FIG. 1 shows a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to managing the processing of network data units (NDUs) received by a network device. More specifically, embodiments of the invention relate to updating NDU processing information in a network device in response to a link becoming active, where the updating eliminates (or reduces) the NDU loss when the NDU processing information is being updated. In one embodiment of the invention, the NDU processing information includes any information that may be used to process the NDU, which includes determining whether or not to transmit a NDU (e.g., via routing or bridging) and, if so, the port on which to transmit the NDU towards a destination.

The following provides a non-limiting example of a scenario in which embodiments of the invention may reduce NDU loss when the NDU processing information is updated. Turning to the example, consider a scenario in which there is a host (H) that is connected to a first network device (ND1) using a first link (L1) and to a second network device (ND2) using a second link (L2), where ND1 and ND2 are on the same Ethernet Segment (ES). If L1 is initially active and L2 is initially inactive, then all NDUs destined for H that are received by ND2 are transmitted from ND2 to ND1. ND1, upon receipt of the NDUs from ND2, transmits the NDUs on L1 to H. When L2 becomes active, ND2 initiates two processes in parallel—(i) Process 1—ND2 notifies ND1, as well as other network devices to which is it connected, that ND2 is now able to directly (e.g., via L2) transmit NDUs to H, and (ii) Process 2—ND2 updates its NDU processing information such that NDUs received for H are now transmitted to H via L2 instead of being transmitted to ND1. Depending on the implementation of ND2, the updating of the NDU processing information on ND2 may take some time to complete (referred to as the updating window). While in the updating window, ND2 may receive NDUs destined for H from other network devices, where these NDUs are received after Process 1 has been completed but Process 2 has not been completed. Prior to implementing embodiments of the invention, NDUs received after Process 1 is completed but while ND2 is in the updating window would be dropped. This would result in a degradation of performance of ND2 until the updating window is closed (i.e., Process 2 is completed). However, embodiments of the invention prevent or decrease NDU loss by ND2 while ND2 is in the updating window.

FIG. 1 shows a system in accordance with one or more embodiments of the invention. The system includes one or more network devices (104, 106, 108) operatively connected via a network using one or more network overlay virtualization (NVO) tunnels (112, 114, 116). The system further includes hosts (100, 102), each of which may be directly connected to one or more network devices (104, 106, 108). Each of these components is described below.

In one or more embodiments, a network device (e.g., 104, 106, 108) includes functionality to receive NDUs (e.g., frames, packets, tunneling protocol frames, etc.) at any of the physical network interfaces (i.e., ports) of the network device and to process the NDUs. In one or more embodiments, processing a NDU includes using NDU processing information. The NDU processing information includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network data unit); (ii) whether to mirror the network data unit; and/or (iii) determine how to route/forward the network data unit in order to transmit the network data unit from an interface of the network device.

In one or more embodiments, a network device also includes and/or is operatively connected to device persistent storage and/or device memory (i. e., non-transitory computer readable mediums used to provide persistent storage resources and/or memory resources) storing software and/or firmware.

Such software and/or firmware may include instructions which, when executed by the one or more processors) of a network device, cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 104, 106, 108) is part of a network. A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network devices 104, 106, 108)) that facilitate network connectivity for one or more operatively connected devices (e.g., computing devices, data storage devices, other network devices, etc.). In one or more embodiments, the network device and other devices within the network (not shown) are arranged in a network topology (see e.g., FIG. 1). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one embodiment of the invention, the network devices (104, 106, 108) transmit NDUs (which may be encapsulated NDUs) via one or more NVO tunnels (112, 114, 116). NVO tunnels (112, 114, 116) may use an Internet Protocol (IP) encapsulation, where the source IP address in the encapsulated NDU identifies a source network device that is performing the encapsulation of the NDU and the destination IP address in the encapsulated NDU identifies a destination network device that is performing the decapsulation of the encapsulated NDU. Non-limiting examples of IP encapsulation protocols that may be used for IP encapsulation include Multi-Protocol Label Switching (MPLS) protocol, MPLS over User Datagram Protocol, MPLS over Generic Network Encapsulation, virtual extensible local area network (VXLAN) protocol, and Network Virtualization Using Generic Routing Encapsulation (NVGRE).

In one embodiment of the invention, Host A is multi-homed to network device A (104) and network device B (106). Accordingly, Host A may communicate with network device A and network device B via the active links (described below) that are part of an Ethernet Segment (ES, 110) (described below). From the perspective of Host A, the links to network devices A and B, which are part of the ES, appear as a link aggregation group (LAG). When network element A and network element B are configured to support multihoming for Host A, they are associated with an Ethernet VPN Instance (EVI).

The following described an example of an Ethernet Segment (ES) in accordance with one or more embodiments of the invention. Turning to the example, when a customer site (e.g., host A) is connected to one or more provider edges (e.g., network devices A and B) via a set of Ethernet links, then this set of Ethernet links constitutes an "Ethernet segment". From the perspective of host A, it will appear as a LAG. Further, when a network device is multihomed to two or more PEs, the set of Ethernet links may also be referred to as an Ethernet segment. In this scenario, the Ethernet segment appears as a link aggregation group (LAG) to the network device.

In one embodiment of the invention, the link between the network device and the host is considered active when the network device can transmit NDUs directly to the host via the link. However, if network device cannot transmit NDUs directly to the host via the link, then the link is deemed to be inactive (even though there is still a direct physical connection (i.e., the link) between the network device and the host.

In one embodiment of the invention, a host (100, 102) may be any type of system (e.g., software and computer hardware) that is configured to generate, send, receive, and/or process requests and replies either locally or over a network using software and computer hardware. A host (100, 102) may include one or more processor(s), memory, and one or more physical network interface(s). Further, a host (100, 102) may include functionality to generate, receive, and/or transmit NDU. Examples of a host (100, 102) include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

In one embodiment of the invention, the host may have executing thereon one or more virtual machines (VMs). In this scenario, multiple VMs may be using (e.g., transmitting and receiving NDUs) via the same Ethernet port and thus all the VMs will be on the same ES. Though not shown in FIG. 1, in another embodiment of the invention, the ES may be connected to a layer 2 switch. The layer 2 switch may then be connected to multiple hosts. In this scenario, all of the aforementioned hosts would be on the same ES.

While FIG. 1 shows a configuration of components, other system configurations may be used without departing from the scope of the invention.

Figure 2:
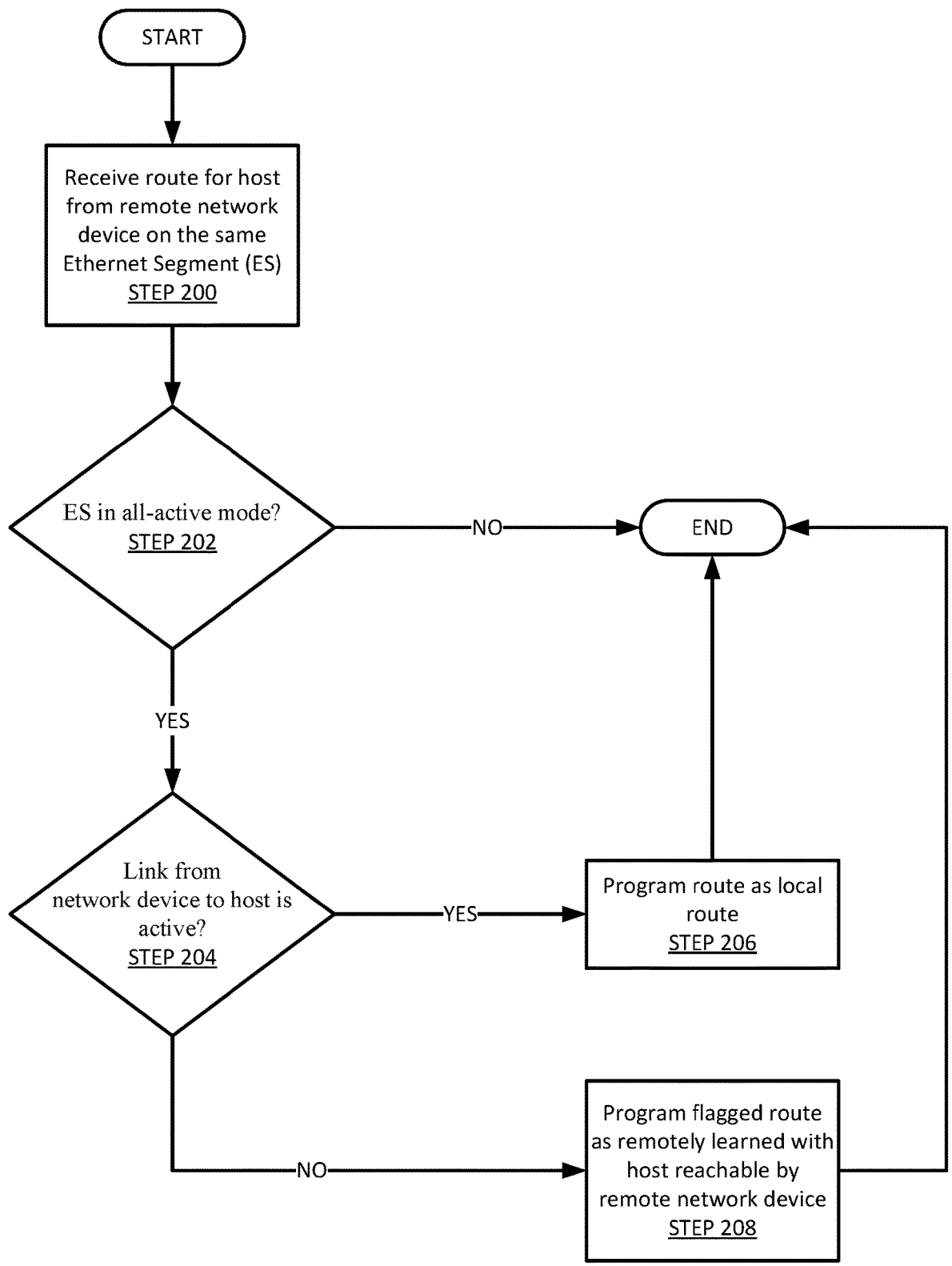
FIG. 2 shows a method for programming a network device with a flagged route in accordance with one or more embodiments of the invention.

FIG. 2 shows a method for programming a network device with a flagged route in accordance with one or more embodiments of the invention. The method shown in FIG. 2 may be performed on by a network device. While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a route is received by the network device from the remote network device, where the network device and the remote network device are on the same Ethernet Segment (see e.g., Network Device A and B, FIG. 1). The route specifies that a host (which may be identified by a media access control (MAC) address) is accessible via the remote network device. In one embodiment of the invention, the route (which may be a local route or a flagged route) (defined below) may be implemented as MAC address table entries in the network device.

The route may be Type 2 route (also referred to as an EVPN MAC/IP route (Type-2), which is generated and advertised by the remote network device. The Type 2 route may include one or more of the following pieces of information: an Ethernet Segment Identifier (ESI) (i.e., an ES associated with the network device and the remote network device), a MAC address (i.e., the MAC address of the host), and Ethernet Tag ID (ETID) (which may be derived from a VLAN ID). The Ethernet Tag ID includes information that identifies a particular broadcast domain (e.g., a VLAN(s)) in the EVI. Other information may be included in the advertisement without departing from the invention.

In step 202, a determination is made about whether the ES (i.e., the ES to which the network device and the remote network device belong) is operating in all-active mode. When all network devices attached to an ES are allowed (e.g., configured) to forward NDUs to/from that ES, then the ES is defined to be operating in all-active mode. If the ES is operating in all-active mode, the process proceed to step 204; otherwise, the process end.

In step 204, a determination is made about whether the link between the network device and the host (i.e., the host specified in the route received in step 200) is active. The link between the network device and the host is considered active when the network device can transmit NDUs directly to the host via the link. However, if network device cannot transmit NDUs directly to the host via the link, then the link is deemed to be inactive (even though there is still a direct physical connection (i.e., the link) between the network device and the host. If the link is active, then the process proceeds to step 206; otherwise, the process proceeds to step 208.

In step 206, the route is programmed into the network device as a local route. When the route is deemed to be a local route, the route is programmed in the same manner as if the route was locally learned (i.e., the network device received a NDU, with a MAC address of the host, directly from the host). Programming the route includes updating one or more tables (or other data structures that makeup the NDU processing information) in the network device. For example, the network device may include a set of tables each associated with a different VLAN ID (or a different VXLAN network identifier (VNI)). In such scenarios, one or more tables in the set of tables is updated to include an entry that maps the MAC address of the host to an egress port on the network device, where the egress port is connected to the link that connects the network device to the host. In one embodiment of the invention, the route received in step 200 specifies an ES and a MAC address associated with the host. As part of the programming processing step 206, the network device may use information about the ES to determine which egress port(s) is directly connected to the host. Using this information, the network device may program the route using the MAC address received in step 200 in combination with the determined egress port(s).

In step 208, the route is programmed as flagged route. Programming the flagged route includes updating one or more tables (or other data structures that makeup the NDU processing information) in the network device. For example, the network device may include a set of tables each associated with a different VLAN ID (or a different VXLAN network identifier (VNI)). In such scenarios, one or more tables in the set of tables are updated to include an entry (which may be referred to as flagged route) that maps the MAC address of the host to NVO tunnel (or an identifier associated with the NVO tunnel) that connects the network device with the remote network device. For example, if the NVO tunnel is implemented using VXLAN, then the entry may include a mapping between the MAC address and a virtual tunnel endpoint (VTEP) IP address. In one embodiment of the invention, the programming of the flagged route may including setting a flag on each corresponding entry in the one or more tables programmed in step 208.

Figure 3:
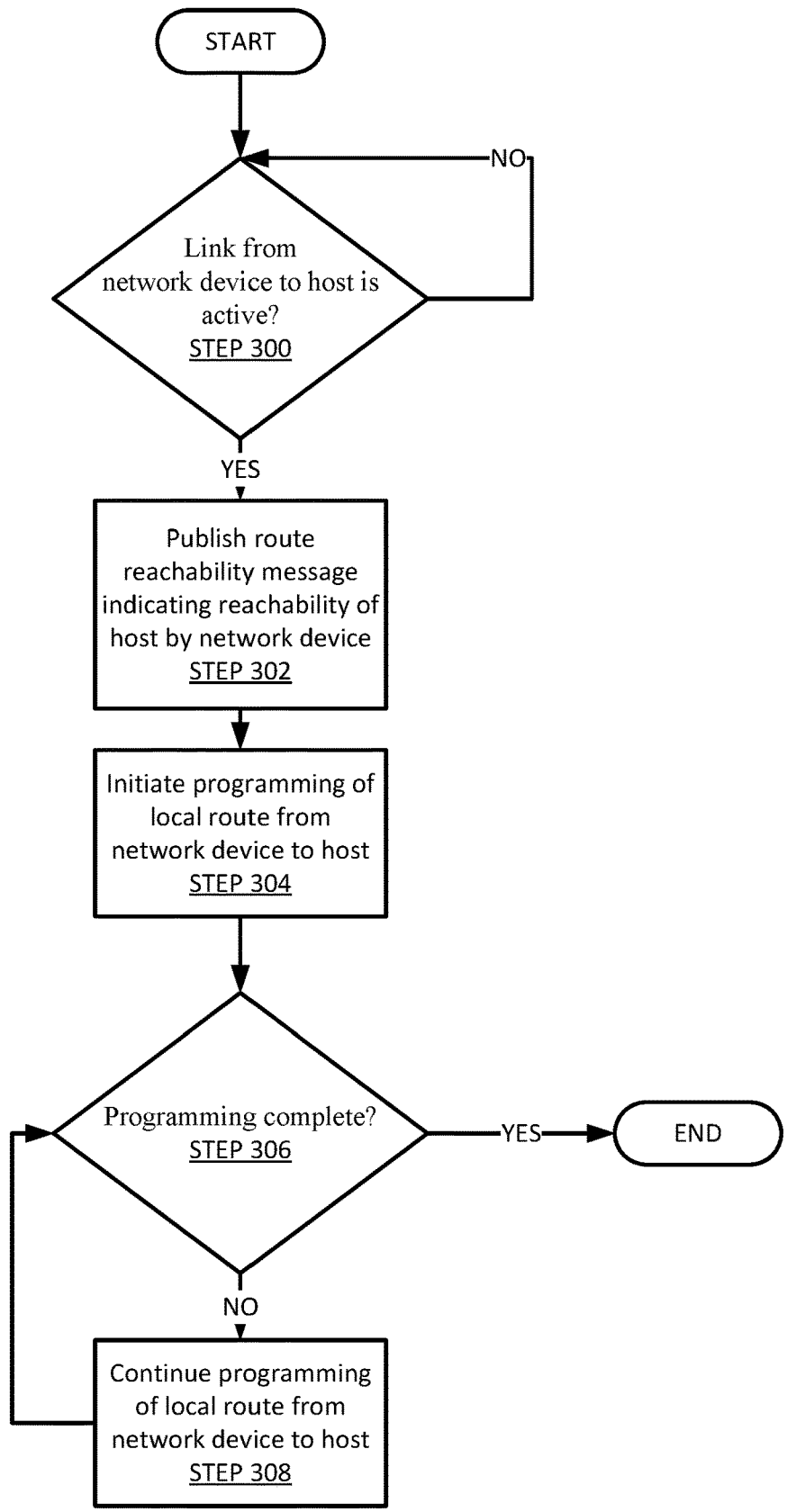
FIG. 3 shows a method for programming a network device with a local route once a link to the host is active in accordance with one or more embodiments of the invention.

FIG. 3 shows a method for programming a network device with a local route once a link to the host is active in accordance with one or more embodiments of the invention. The method shown in FIG. 3 may be performed on by a network device. While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a determination is made about whether the link between network device and the host is active (e.g., network device B in FIG. 1 determines whether its link to host A is active). More specifically, the determination in step 300 includes monitoring the status of the link between the network device and the host and then determining when the link transitions from being inactive to active. If the link is determined to be active (or transitions from being inactive to active), the method proceeds to step 302; otherwise, the network device continues to monitor the state of the link between itself and the host.

In step 302, the network device publishes a route reachability message indicating reachability of the host by network device. The route reachability message may be published to the remote network device as well as other network devices connected to the network device via the network.

In one embodiment of the invention, the route reachability message is a Type 1 route that specifies the ES (using an ESI for the ES) and the NVO tunnel identifier associated with the network device. For example, if the NVO tunnel is implemented using VXLAN, the route reachability message may include the ESI and a VTEP IP address for the VTEP on the network device. In another example, if the NVO tunnel is implemented using MPLS, then the route reachability message may include the ESI and a MPLS label associated with the network device. The route reachability message may include other information without departing from the invention.

In step 304, the network device initiates the programming of a local route. Programming the route includes updating one or more tables (or other data structures that makeup the NDU processing information) in the network device. For example, the network device may include a set of tables each associated with a different VLAN ID (or a different VXLAN network identifier (VNI)). In such scenarios, one or more tables in the set of tables is updated to include an entry that maps the MAC address of the host to an egress port on the network device, where the egress port is connected to the link that connects the network device to the host. The programming of the local route may include replacing or updating a previously programmed flagged route with the local route. For example, the previously programmed flagged route may be [MAC address, VTEP B] which may be updated to [MAC, Egress Port A], where the MAC address is associated with the host, VTEP B is associated with the NVO tunnel between the network device and the remote network device, and Egress Port A is connected to the link between the network device and the host.

As discussed above, there may be large number of tables that need to be updated in the network device to include the local route. More specifically, the programming initiated in step 304 may require that a large number of entries which may be spread across a larger number of tables (e.g., one table per VLAN) be updated to use the local route. Further, if there are multiple VMs executing on the host, then the aforementioned updating is performed for each of the VMs. Thus, if there are 100 VLANs per host and five virtual machines on the host, then the programming in step 304 may include updating entries in tables associated with each of the 100 VLANs for each of the VMs (e.g., potentially updating 500 entries across 100 tables). Accordingly, the programming initiated in step 304 may take some time to complete. While the programming is being performed, there may be some tables that are updated (i.e., that include the local route) while other tables in the network device are waiting to be updated (i.e., they include the flagged route).

In step 306, a determination is made about whether the programming initiated in step 304 is completed. If the programming is complete, the process ends; otherwise, the process proceeds to step 308.

In step 308, the programming initiated in step 304 continues until the programming initiated in step 304 is completed (based on a determination in step 306).

Figure 4:
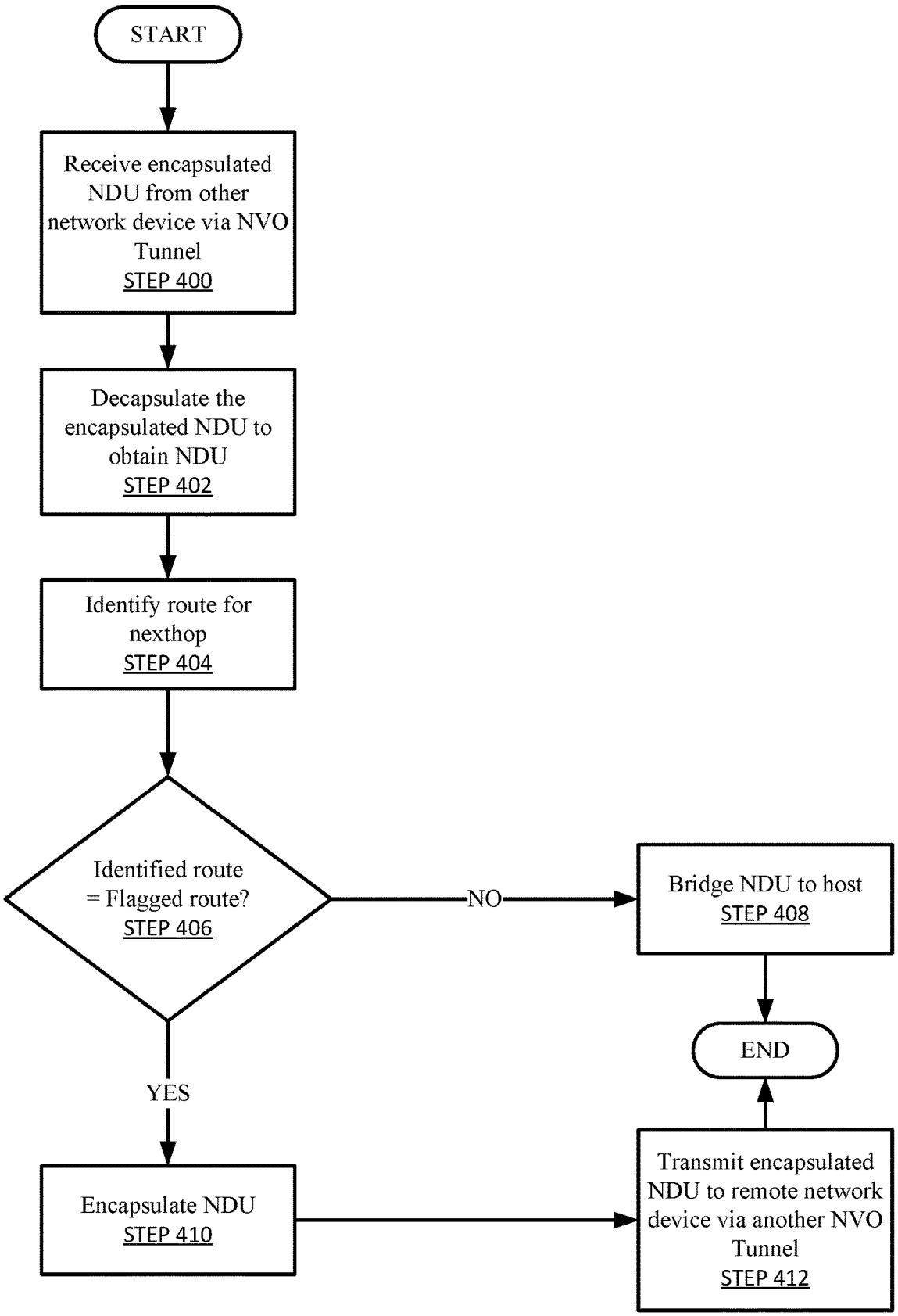
FIG. 4 shows a method for processing network data units by the network device in accordance with one or more embodiments of the invention.

FIG. 4 shows a method for processing NDUs by the network device in accordance with one or more embodiments of the invention. The method shown in FIG. 4 may be performed on by a network device. While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, an encapsulated NDU is received by the network device (e.g., Network Device A, FIG. 1) from another network device (e.g., Network Device C, FIG. 1) via a NVO tunnel.

In step 402, the network device decapsulates the encapsulated NDU to obtain the NDU. The specific decapsulation processing performed to obtain the NDU is based on the specific implementation of the NVO tunnel.

In step 404, the NDU is analyzed to determine the nexthop for the NDU. The analysis may include obtaining the MAC address specified in the NDU and then performing a lookup in a table on the network device to identify an entry that includes the MAC address. The table upon which the lookup is performed is associated with a VLAN (or VNI) and is identified using other information in the NDU or other information in the network device. The result of the lookup is an entry that corresponds to a previously programmed route.

In step 406, a determination is made about whether the route identified in step 404 is a flagged route (i.e., a route previously programed in accordance with step 208). If the route is a flagged route, the process proceeds to step 410; otherwise, the process proceeds step 408.

In step 408, when the route is not a flagged route (i.e., the route is a local route), then the NDU is bridged to the host on the link between the network and the host via the egress port specified in the route.

When the route is a flagged route, the NDU is processed in accordance with steps 410 and 412. The route may be flagged route in scenarios in which the link between the network device and the host is active or inactive. For example, when the programming in step 304 has been initiated (i.e., the link is active) but has not been completed, then even though the link is active, the NDU is not transmitted via the link. This may occur in scenarios in which the table associated with the VLAN (or VNI) that is used for the lookup in step 404 has not been updated to replace the flagged route with the local route.

Continuing with the discussion of FIG. 4, in step 410, the NDU is encapsulated to obtain an encapsulated NDU. The encapsulation may be based on the specific NVO tunnel over which the encapsulated NDU is to be transmitted. The information used in the encapsulation may be obtained from the flagged route (e.g., the VTEP IP address may be obtained from the flagged route).

In step 412, the encapsulated NDU is transmitted to the remote network device via the NVO tunnel that connects the network device and the remote network device. The remote network device, which is on the same ES as the network device subsequently receives the encapsulated NDU, decapsulates the NDU, and then bridges the NDU to the host via a link between the remote network device and the host.

Figure 5A:
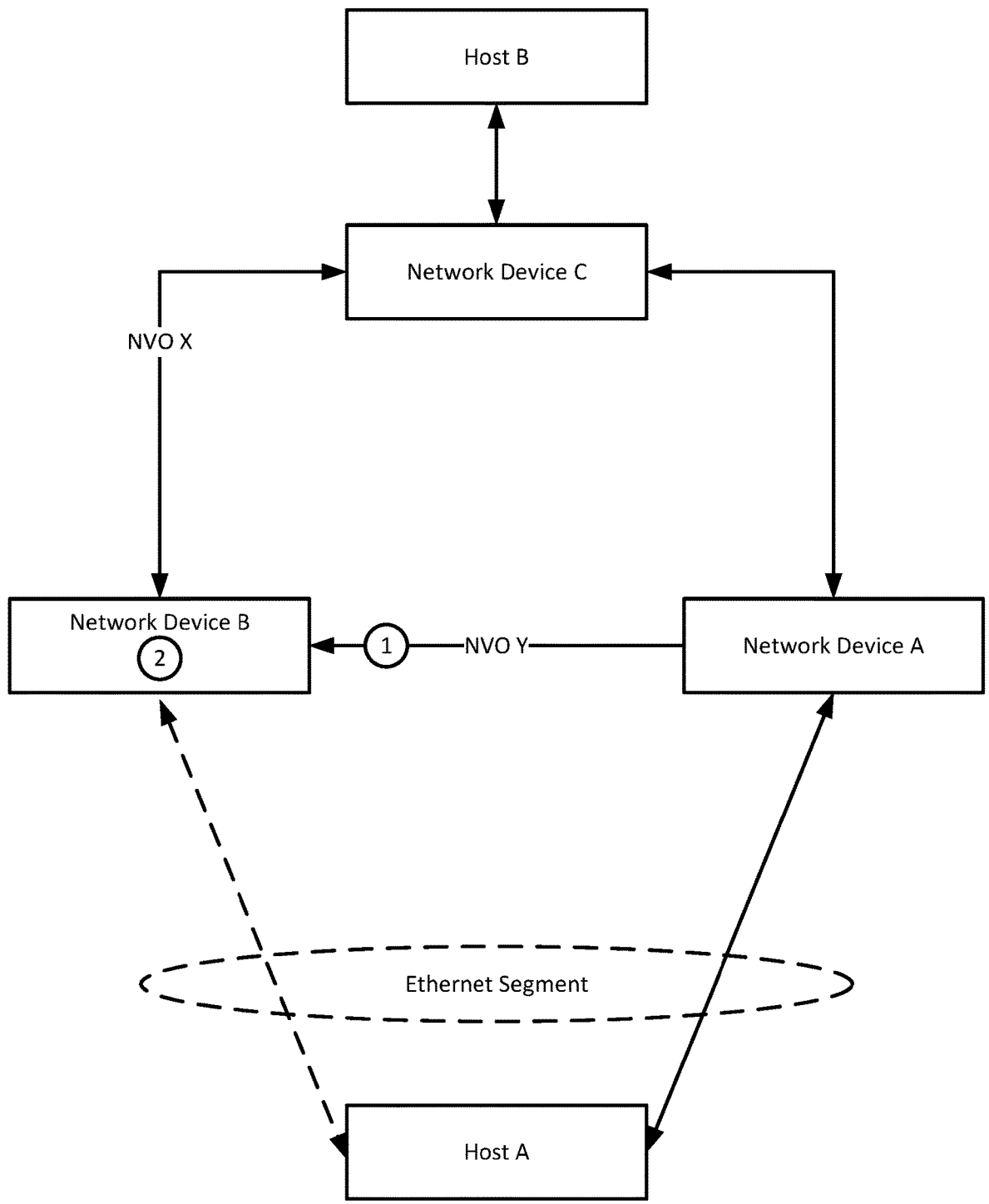
FIGS. 5A-5C show an example in accordance with one or more embodiments of the invention.
Figure 5B:
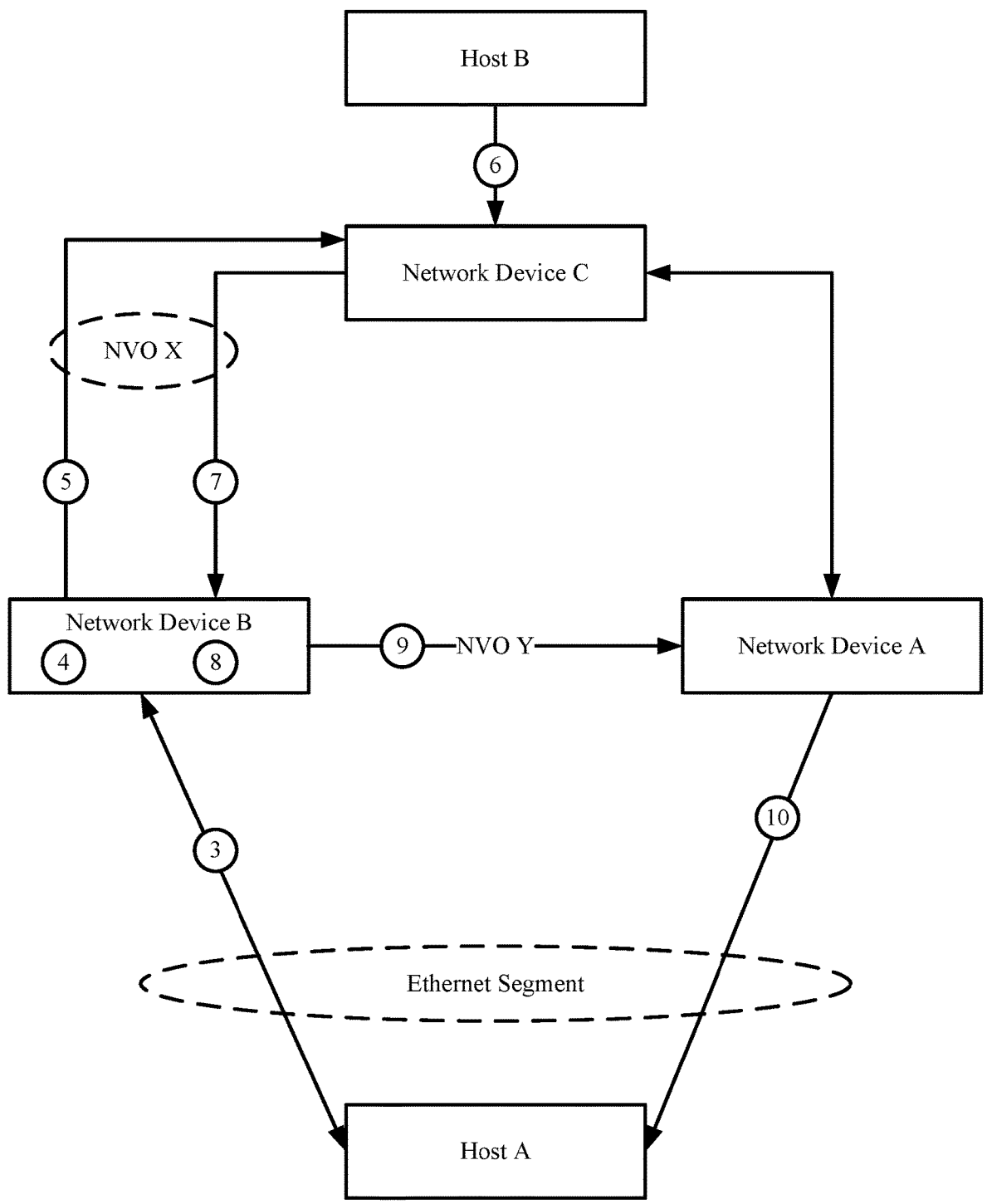
Figure 5C:
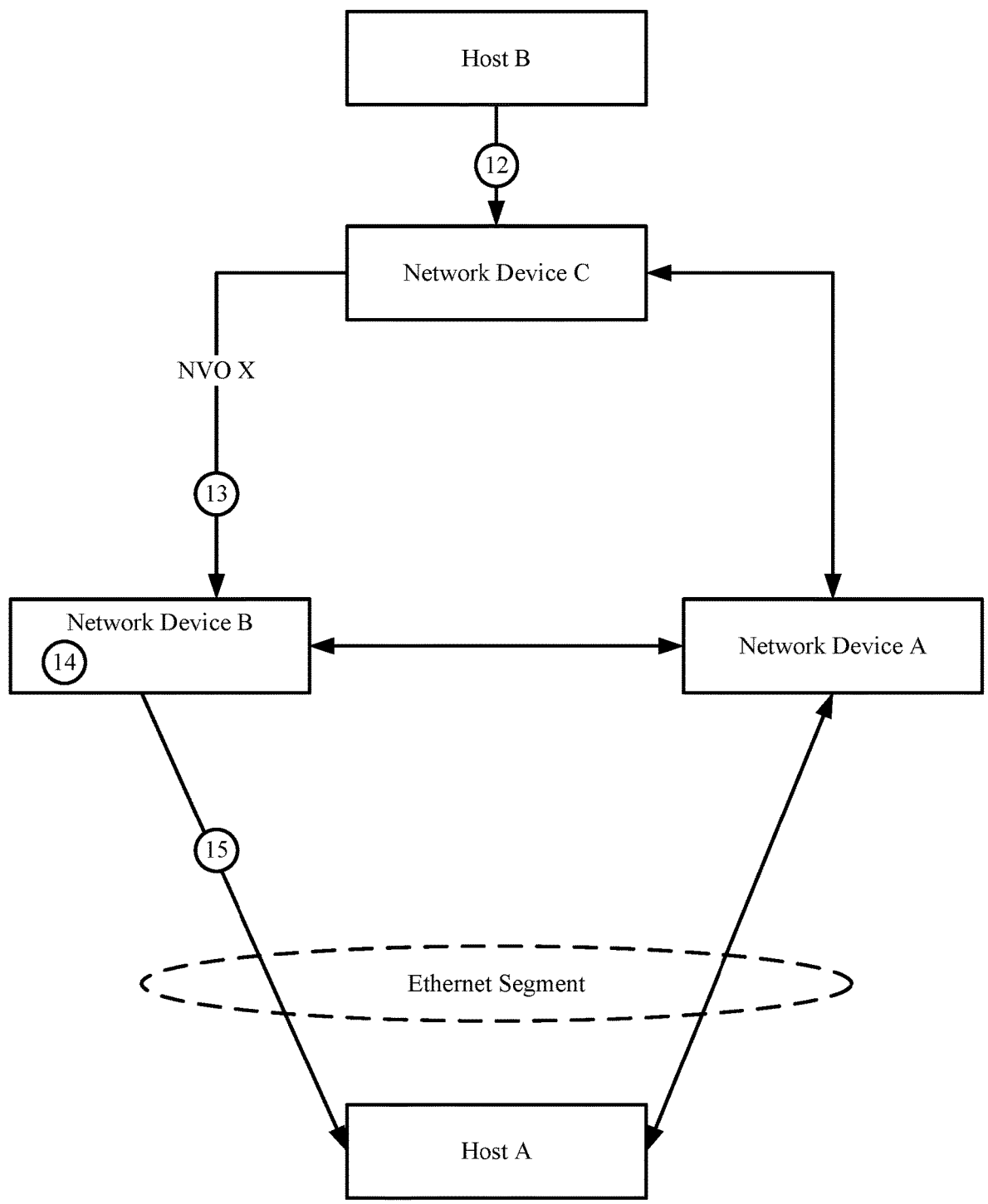

FIGS. 5A-5C show an example in accordance with one or more embodiments of the invention. The example is not intended to limit the scope of the invention.

Turning to the example, referring to FIG. 5A, consider a scenario in which Host A initially has one active link to Network Device A and an inactive link to Network Device B, where both the active link and inactive link are associated with the Ethernet Segment. Network Device A subsequently advertises a route to Network Device B via Network Virtualized Overlay (NVO) tunnel Y (NVO Y) [1]. The route indicates that Host A is accessible via Network Device A. Upon receipt of the route, Network Device B performs the method described in FIG. 2. Specifically, Network Device B programs a flagged route [2]. The received route is programmed as a flagged route because the following conditions are satisfied: (i) Network Device A and Network Device B are on the Ethernet Segment, (ii) the Ethernet Segment is operating in all-active mode; and (iii) the link between Host A and Network Device B is inactive.

Referring to FIG. 5B, at a later point in time, the link between Host A and Network Device B becomes active [3]. In response to determining that the link between Host A and Network Device B is active, Network Device B initiates the programming of a local route (i.e., a route from Network Device B directly to Host A) [4], generates and publishes a route reachability message to Network Device C [5]. The route reachability message specifies that Host A is reachable via Network Device B. In this example, the route reachability message is a Type-1 route that specifies that the ES connected to Network Device B is active.

After Network Device C receives the route reachability message published by Network Device B, it receives a NDU from Host B destined for Host A [6]. Network Device C, using information in the previously received route reachability message, transmits an encapsulated NDU via NVO X to Network Device B [7]. The encapsulated NDU is generated by encapsulating the NDU received from Host B using the encapsulation protocol implemented on NVO X.

Network Device B subsequently receives the encapsulated NDU, decapsulates the encapsulated NDU to obtain the NDU, and then determines (in accordance with method illustrated in FIG. 4) that the nexthop for the NDU is a flagged route [8]. While the programming of a local route was previously initiated, due to the large number of tables that need to be updated to include the local route, the programming has not yet been completed (or at least the programming for the table that is used to determine the nexthop for the NDU has not been completed). Accordingly, when the nexthop for the NDU is determined, the result of the determination is the flagged route. This determination occurs even though there is now an active link between Network Device B and Host A. In response to the determination, the NDU is again encapsulated to obtain a second encapsulated NDU and the second encapsulated is transmitted via NVO Y to Network Device A [9]. The second encapsulated NDU is generated by encapsulating the NDU using the encapsulation protocol implemented on NVO Y.

Upon receipt of the second encapsulated NDU, Network Device A decapsulates the second encapsulated NDU to obtain the NDU, and then determines (in accordance with method illustrated in FIG. 4) that the nexthop for the NDU is a local route on Network Device A. In response to this determination, Network Device A bridges the NDU to Host A via the active link between Network Device A and Host A [10].

Referring to FIG. 5C, at a later point in time Network Device C receives a second NDU from Host B destined for Host A [12]. Network Device C, using information in the previously received route reachability message, transmits a third encapsulated NDU via NVO X to Network Device B [13]. The third encapsulated NDU is generated by encapsulating the second NDU received from Host B using the encapsulation protocol implemented on NVO X.

Network Device B subsequently receives the third encapsulated NDU, decapsulates the third encapsulated NDU to obtain the second NDU, and then determines (in accordance with method illustrated in FIG. 4) that the nexthop for the second NDU is a local route [14]. This determination occurs because the following conditions as satisfied: (i) there is an active link between Network Device B and Host A, and (ii) the programming of the local route into the tables in Network Device B has been completed (or at least the programming for the table that is used to determine the nexthop for the second NDU has been completed). In response to this determination, Network Device B bridges the second NDU to Host A via the active link between Network Device B and Host A [15].

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing network data units (NDUs), the method comprising:

receiving, by a first network device, a route from a second network device;

making a first determination that the route is associated with a host that has an active link with the second network device;

making a second determination that:
the first network device is associated with Ethernet Segment (ES) and that the second network device is on the ES;

making a third determination that there is no active link between the first network device and the host;

in response to the first determination, the second determination, and the third determination:
programming, by the first network device, a flagged route in the first network device, the flagged route being based on the route;

determining that a second active link is established between the first network device and the host;

obtaining, by the first network device, a NDU from an encapsulated NDU received via first network virtualization overlay (NVO) tunnel not connected to the second network device, the encapsulated NDU being received after the programming of the flagged route;

making a fourth determination, after the second active link is established and using the flagged route, that a nexthop for the NDU is the second network device;

based on the fourth determination, encapsulating the NDU to obtain a second encapsulated NDU; and transmitting, via a second NVO tunnel between the first and second network device, the second encapsulated NDU to the second network device.

2. The method claim 1, further comprising:

after the second active link is established, initiating programming of a local route in the first network device, wherein the local route is associated with the host and the active link.

3. The method claim 1, further comprising:

after the second active link is established, transmitting a second route to a plurality of network devices, wherein second route specifies that the host is directly reachable by the first network device.

4. The method of claim 1, wherein the plurality of network devices comprises a third network device, wherein the encapsulated NDU originated from the third network device, and wherein the encapsulated NDU is received by the first network device after transmitting the second route to the plurality of network devices.

5. The method of claim 1, wherein the programming of the local route is not completed prior to the fourth determination.

6. A method for processing network data units (NDUs), the method comprising:

obtaining, by a network device, a NDU from an encapsulated NDU received via first network virtualization overlay (NVO) tunnel not connected to a second network device, wherein the NDU is destined for a host on an Ethernet Segment (ES);

making a first determination that a nexthop for the NDU is the second network device, wherein the network device and the second network device are associated with the ES, based on the first determination, encapsulating the NDU to obtain a second encapsulated NDU; and transmitting, via a second NVO tunnel between the network device and the second network device, the second encapsulated NDU to the second network device, wherein the network device has an active link to the host and wherein the second network device has a second active link to the host.

7. The method claim 6, further comprising:

making a second determination that the network device has the active link to the host, wherein the second determination is made prior obtaining the NDU; and based on the second determination, initiating programming of a local route in the network device, wherein the local route is associated with the host and the active link.

8. The method of claim 7, further comprising:

based on the second determination, transmitting a route to a plurality of network devices using at least the first NVO tunnel, wherein route specifies that the host is directly reachable by the network device.

9. The method of claim 8, wherein the plurality of network devices comprises a third network device, wherein the encapsulated NDU originated from the third network device, and wherein the encapsulated NDU is received by the network device after transmitting the route to the plurality of network devices.

10. The method of claim 8, wherein the route is an auto-discovery route.

11. The method of claim 7, wherein the programming of the local route is not completed prior to the first determination.

12. The method of claim 11, wherein the programming of the local route is completed after the transmission of the second encapsulated NDU.

13. The method of claim 6, further comprising:

prior to the first determination:

programming a flagged route in the network device, wherein the nexthop is specified in the flagged route, wherein the encapsulation of the NDU to obtain the second NDU is permitted based on the presence of the flagged route in the network device.

14. The method of claim 13, wherein the flagged route is programmed in response to a route received from the second network device.

15. The method of claim 6, wherein the first NVO tunnel uses Multiprotocol Label Switching (MPLS).

16. The method of claim 6, wherein the first NVO tunnel uses Virtual Extensible Local Area Network (VXLAN) protocol.

17. A network device, comprising:

a processor; and memory comprising instructions, which when executed by the processor enable the network device to perform a method, the method comprising:

obtaining a network data unit (NDU) from an encapsulated NDU received via first network virtualization overlay (NVO) tunnel not connected to a second network device, wherein the NDU is destined for a host on an Ethernet Segment (ES);

making a first determination that a nexthop for the NDU is the second network device, wherein the network device and the second network device are associated with the ES, based on the first determination, encapsulating the NDU to obtain a second encapsulated NDU; and transmitting, via a second NVO tunnel between the network device and the second network device, the second encapsulated NDU to the second network device, wherein the network device has an active link to the host and wherein the second network device has a second active link to the host.

18. The network device of 17, wherein the method further comprises:

making a second determination that the network device has the active link to the host, wherein the second determination is made prior obtaining the NDU; and based on the second determination, initiating programming of a local route in the network device, wherein the local route is associated with the host and the active link.

19. The network device of 8, wherein the method further comprises:

based on the second determination, transmitting a route to a plurality of network devices, wherein route specifies that the host is directly reachable by the network device.

20. The network device of 19, wherein the plurality of network devices comprises a third network device, wherein the encapsulated NDU originated from the third network device, wherein the encapsulated NDU is received by the network device after transmitting the route to the plurality of network devices, wherein the programming of the local route is not completed prior to the first determination, and wherein the programming of the local route is completed after the transmission of the second encapsulated NDU.

* * * * *

UNITED STATES PATENT AND TRADEMARK OFFICE
CERTIFICATE OF CORRECTION

| | | |
|---|---|---|
| PATENT NO. | : 11,336,485 B2 | Page 1 of 1 |
| APPLICATION NO. | : 16/726183 | |
| DATED | : May 17, 2022 | |
| INVENTOR(S) | : Rajesh Kumar Semwal and Amit Dattatray Ranpise | |

It is certified that error appears in the above-identified patent and that said Letters Patent is hereby corrected as shown below:

In the Claims

Claim 18, Column 12, Line 23, the word "17" should read -- claim 17 --.

Claim 19, Column 12, Line 32, the word "8" should read -- claim 18 --.

Claim 20, Column 12, Line 38, the word "19" should read -- claim 19 --.

Signed and Sealed this
Sixteenth Day of August, 2022

Katherine Kelly Vidal
*Director of the United States Patent and Trademark Office*